Oct. 16, 1962 J. W. ANDERSON Re. 25,266

MOTION-TRANSMITTING ASSEMBLY

Original Filed Jan. 30, 1956

INVENTOR.
JOHN W. ANDERSON
BY
Charles S. Perfold
ATTORNEY

United States Patent Office

Re. 25,266
Reissued Oct. 16, 1962

25,266
MOTION-TRANSMITTING ASSEMBLY

John W. Anderson, 578 Broadway, Gary, Ind.

Original No. 2,901,764, dated Sept. 1, 1959, Ser. No. 562,269, Jan. 30, 1956. Application for reissue May 9, 1960, Ser. No. 27,980
4 Claims. (Cl. 15—250.25)

Matter enclosed in heavy brackets [ ] appears in the original patent but forms no part of this reissue specification; matter printed in italics indicates the additions made by reissue.

The invention relates generally to windshield wiper apparatus and more particularly is directed to means for operatively connecting a pair of relatively movable components, such as a drive shaft of a motor or power unit and a driven shaft which supports and actuates a wiper arm carrying a wiper blade.

Various connection means have heretofore been employed for operatively connecting a wiper motor with a shaft for a wiper arm for directing the arm and a blade thereon back and forth across a windshield. One conventional organization now being employed for this purpose comprises a motor having a drive shaft provided with cranks, a pair of driven shafts supporting cranks and wiper arms carrying wiper blades, and a pair of links which are respectively connected to the cranks for oscillating the wiper arms and blades in unison.

In such a conventional organization, the lengths of certain components, the points of connection therebetween and the distances between the drive shaft of the power unit and the driven shafts for the wiper arms are predetermined so that if, for example, any one of the components is not of the proper length or accurately positioned, the complete organization may be thrown out of commission or a part thereof rendered incapable of correct operation.

In the conventional bell-crank arrangement, the oscillating ranges of the wiper arms, due to the character of the linkages, are each substantially limited to 120 degrees and this, of course, is not a sufficient range to wipe the larger areas of the present wrap-around windshields, particularly those in which the wing portions thereof are relatively wide and extend rearwardly appreciable distances.

When the crank on the pivot shaft is at either end of the stroke the effective leverage is shortest and power transmitted by the shaft is least. At such times the blade is at an end of its stroke, where available power should not be lessened—because to start the blade requires more power than to keep it moving once it is started. Also, in heavy snow it is desirable not to reduce power at the end of the stroke where snow packs to limit the travel of the blade. Maximum power is desirable to push the snow load off the pattern normally wiped. The term "power" is used herein in the sense of, and interchangeably with, the term "torque."

Aggravating the above condition described, the location of each pivot bearing with relation to the motor shaft often varies in distance, due to the difficulty encountered in maintaining pivot locations accurately in the body shell, which carries them. This results in the crank, at one end of the stroke, being carried closer to dead center, with the result that power at a stroke end is further reduced. Resultant excess stress in the motor mechanisms, particularly where electric motors are used, causes breakage of motor parts such as gears. It should also be noted that the distance between the two pivot bearings changes as the vehicle encounters cold, which contracts the car body, or heat, which expands the body.

Noise develops in operation as the connection between the link and the bell crank wears.

Misalignment of a pivot shaft cramps the connection between crank and link—to cause friction and reduce torque. Ball joints, at added cost, are sometimes substituted for the cheaper pivot-pin joint, to correct this condition.

Another type of wiper driving mechanism employs a cable to connect the motor to the pivots—the linkage bars and bell cranks being omitted, with grooved pulleys substituted. The greater length of cable required in such so-called cable drives causes serious cumulative slack from stretching of the cable under load. This stretching alters the movement of the blades and changes undesirably their wipe pattern, often causing destructive slapping of the wiper blade against the windshield frame.

It has been necessary periodically to take slack out of such long cables to restore wiper efficiency. This service is costly and requires laying up of the car for a period. To prevent such costs and delays there has been provided more recently on some makes of cars, at considerable added cost, a manually operated spring-loaded pivot shaft assembly by which such cable slack may be removed more conveniently and without making difficult adjustments in the crowded area behind the instrument panel of the car.

The subject invention obviates all of the above difficulties and comprises a cable which applies thrust tangentially to a grooved pulley always at the same distance from the center of the pivot shaft. Since the radius of the pulley is constant, the thrust acting at the constant radius develops a constant torque on the pivot shaft. Both the speed of travel and the torque on the blade are substantially uniformly responsive to the motor drive, throughout its stroke, to any extent permitted by the action of the motor. More power may be applied to the arm and blade assembly at the ends of its stroke. Where a bell crank driver is carried by the motor shaft the subject invention transmits greater power at each end of the stroke, where needed, because of the toggle action of the crank and linkage.

Distances between pivot shafts may vary for reasons described without causing any variation in the distribution of torque to the arm and blade and without damaging the motor by creating excessive approach to a dead center condition in the relation of pivot center, linkage, and crank.

The operation of the device remains substantially noiseless, thus avoiding an annoyance common to many bell-crank types of linkage.

Error in alignment of pivot shafts with relation to car body and windshield does not cramp the device appreciably or cause any substantial additional friction or loss of torque, as may occur when the conventional bell crank pivot drive is used.

The shorter length of cable employed does not produce, under average conditions, enough stretch to interfere with performance. Under such conditions the less costly construction shown in FIGURE 6 may be employed. When very long arms and long blades under highest pressures are used and loads are much higher (which is the trend in the industry) the simple, automatic means for taking up slack, as shown in FIGURES 2 and 3, may be provided.

With the foregoing in mind, one of the important objects of the invention is to design and construct an apparatus which overcomes completely all of the difficulties encountered with the various devices above referred to by providing unique connection means between the links and driven shafts for the purpose of compensating, within practicable limits, for any variables in the locations and positions of the driven shafts.

More particularly, the connection means constituting the invention includes a pulley or support provided on a driven shaft for a wiper arm and flexible means carried by a link or actuating means operatively connected to the pulley in a manner whereby reciprocation of the link will cause the flexible means to oscillate the pulley and driven shaft. This unique assembly serves to impart a smooth oscillatory motion to the driven shaft as distinguished from the irregular motion in the conventional assembly above referred to.

Furthermore, the oscillatory range of the wiper arm and blade can be appreciably increased, through use of the flexible means and pulley as compared to the limiting factors in the conventional hookup. Also, when the subject invention is employed less output of the motor is required to swing the wiper arms and blades through wider ranges or arcs are compared to the conventional linkage for swinging the arms and blades through shorter ranges or arcs.

Another object of the invention is to provide improved means for attaching the flexible means to the pulley and to the link. This is preferably accomplished by attaching the ends of the flexible means to the link at longitudinally spaced locations and wrapping the flexible means about the pulley and anchoring the same thereto to prevent slippage between the pulley and flexible means.

A specific object of the invention is to provide connection means of the kind described which serve to resiliently support the outer extremities of the links.

An additional object of the invention is to provide an assembly whereby the thrust imparted to the flexible means will be converted by the pulley to torque in the driven shaft.

A further important object of the invention is to provide a novel assembly whereby the flexible means is always maintained in a substantially taut condition so that the motion of the flexible means is faithfully transmitted thereby to the pulley.

It is obvious that the subject invention is readily adaptable to many other uses where reciprocating lineal movement is desired to be converted efficiently, quietly, and faithfully into oscillatory rotary movement, or vice versa.

Other attributes of the invention reside in its adaptability, durability, simplicity of design and construction, ease of installation, and efficient operation.

Additional objects and advantages of the invention over the conventional assembly will become apparent after the description hereafter set forth is considered in conjunction with the drawings annexed hereto.

Figure 1:
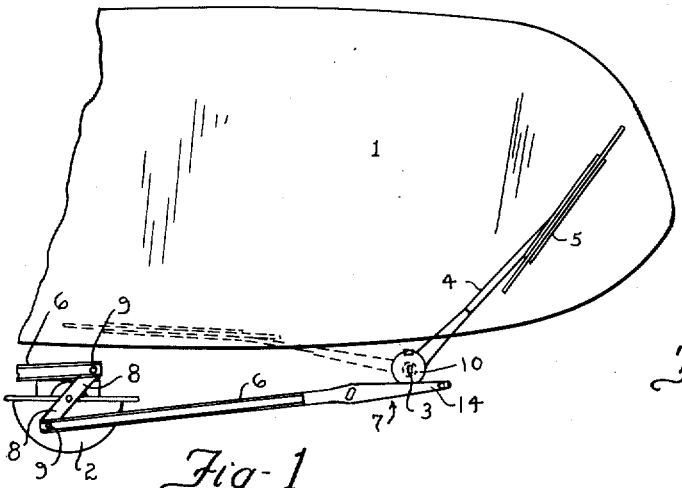
FIGURE 1 is a partial elevational view of the rear side of a windshield illustrating the apparatus embodying the invention, as applied thereto.
Figure 4:
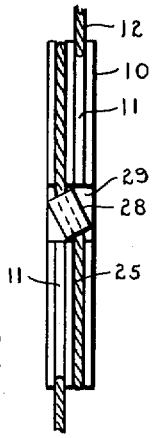
FIGURE 4 is an enlarged top view showing the mode of connecting the flexible means to a pulley.

Referring first to FIGURES 1 through 5 of the drawing, the numeral 1 designates a windshield, 2 a power unit, 3 a driven shaft supporting a wiper arm 4 carrying a wiper blade 5, 6 an actuating means in the form of a link having one end attached to the power unit and its other end operatively connected to the driven shaft by connection means generally designated 7 which embodies the invention. Duplicate connection means are actually employed so as to simultaneously actuate a pair of wiper arms and blades.

Any means suitable for the purpose may be employed to transmit thrust to the links, but as shown, the power unit 2 is of the fluid-operated type. The unit is provided with an oscillatory drive shaft having cranks 8 with pins 9 thereon. The inner extremities of the links 6 are respectively pivotally connected to the pins 9, and the outer extremities to the driven shafts 3 by the connection means 7 as above referred to.

The driven shafts which carry the wiper arms are usually located laterally and equidistant from the power unit in relatively inaccessible areas below and adjacent the ends of the windshield. These shafts are journalled in suitable bearings therefor on the car body. A support preferably in the form of a pulley or wheel 10 is secured to the inner end of each of the driven shafts and the periphery of each pulley is provided with an annular groove 11 which receives a flexible means 12 preferably in the form of a wire cable carried by each of the links. Insofar as the subject invention is concerned, the driven shafts may be geared to shafts which carry the wiper arms. The pulleys and flexible means constitute components of the connection means 7.

Figure 2:
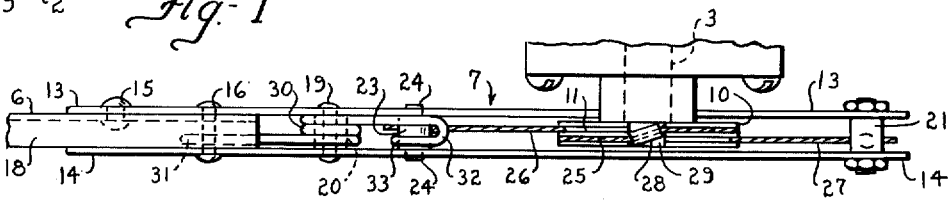
FIGURE 2 is a partial top view of the apapratus in FIGURE 1 showing the connection between a link and a driven shaft for a wiper arm.

The outer extremities of the links 6 may be designed and constructed in various ways, but as disclosed herein each extremity carries an asssembly constituting a component of the connection means 7, of which the cable 12 is a part. Each assembly preferably includes a pair of corresponding elongated plates 13 and 14 which have their inner ends secured to a link by a pair of rivets 15 and 16. The plates may be termed side members or supporting walls constituting continuations of the link. The link is of channel construction and includes a base wall 17 and side walls 18. The plates 13 and 14 respectively bear against the base wall 17 and side walls 18 with the rivet 15 extending through the base wall and the plate 13 and the rivet 16, which is longer than rivet 15, extends through the base wall and both plates as shown in FIGURES 2 and 3.

The plates are also connected or tied together in spaced parallel relation by a rivet 19 having a spacer 20 thereon located a short distance forwardly of the link and by a tubular cylindrical stationary spacer 21 supported on a bolt extending through holes provided therefor in the free ends of the plates. The ends of the rivet 19 are upset to permanently secure the plates together and the bolt and spacer 21 facilitates connection of the cable with the pulley.

Figure 3:
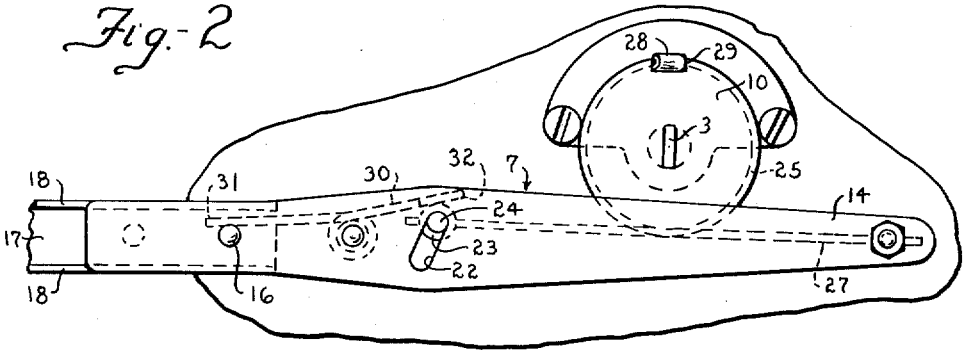
FIGURE 3 is an elevational view of the structure depicted in FIGURE 2 showing the operative relationship of the components and a tensioning device associated therewith.
Figure 5:
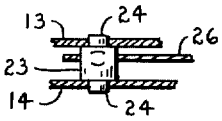
FIGURE 5 is a sectional view showing the manner of attaching a cable to a link.

The plates 13 and 14 are preferably widened to some extent intermediate their extremities as shown in FIGURES 1 and 3 and are provided with guide means, preferably in the form of cam slots 22 which are inclined with respect to the longitudinal axis of the link. A cam 23 has ends 24 projecting through and slidable in the slots as depicted in FIGURES 3 and 5.

The pulley is disposed between the plates 13 and 14 for possible guidance and the cable 12 includes a loop or bight 25 which is wrapped around the pulley and seated in the annular groove 11 thereof. The ends 26 and 27 of the cable are preferably anchored to the cam 23 and stationary spacer 21 by inserting the ends of the cable in holes provided therefor in the cam and spacer and indenting the latter as shown in FIGURES 2 and 5. The loop 25 has a tubular fitting 28 fixed thereto which is seated in a recess or notch 29, provided in the periphery of the pulley, so that the cable will not slip on the pulley. The recess 29 is preferably located at the top of the pulley so that portions of the cable on either side of the fitting 28 will find support on the pulley and will cross at a point directly below or diametrically opposite the fitting and substantially midway between the points of connection between the ends 26 and 27 of the cable and the cam 23 and spacer 21, in order to provide a well-balanced assembly whereby the arm may swing a predetermined distance on either side of a vertical line intersecting the axis of the driven shaft. Insofar as the subject is concerned the parts can be assembled to place the fitting in a different position, so that, for example, the wiper arm and blade will swing through a larger arc from a vertical position toward a wing portion of the windshield than from the vertical toward the center of the windshield.

Attention is directed to the fact that the cable is mounted on the pulley so that the ends 26 and 27 of the cable are aligned and substantially tangent to the pulley and that this relationship is maintained irrespective of the relative operative positions between the link and pulley. This arrangement serves to impart a torque thrust to the pulley, and depending on the stroke or movement of the link, can be utilized to swing a wiper arm and blade through a range or arc of 180 degrees, or more, if desired, as against a maximum range in the neighborhood of 120 degrees, or less, usually permitted by the conventional bell-crank assembly.

As alluded to above, one of the important features of the invention resides in maintaining the cable in a taut condition to compensate for any stretching of the cable. This, in part, is accomplished by a biasing or resilient means, preferably in the form of a helical spring 30 having a coil surrounding the spacer 20 and ends 31 and 32 which respectively find support on the rivet 16 and cam 23 in a manner whereby the end 32 of the spring serves to normally urge the cam toward the lower ends of the slots 22 and thereby tighten the cable and maintain the loop 25 in proper position and under tension on the pulley. The end 32 of the spring is preferably formed to include an offset 33 so that a pair of spaced portions of the spring bear against the cam 23 and assist in stabilizing its position.

In view of the foregoing, it will be manifest that when the power unit is operated the links will be reciprocated to oscillate the pulleys through the intermediation of the flexible means. It will also be evident that the arrangement is preferably such that each link is resiliently supported so that its longitudinal axis is substantially maintained at a uniform distance from the axis of the driven shaft at all times.

Figure 6:
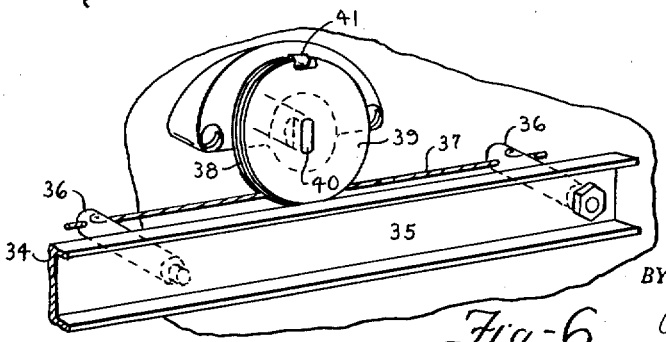
FIGURE 6 is another embodiment of the invention without the tensioning device.

The embodiment of the invention exemplified in FIGURE 6 of the drawing is similar to the preferred embodiment described above, but does not include an assembly incorporating a tensioning device. The structure disclosed in FIGURE 6 offers a desirable assembly where reduced costs in manufacture may be a controlling factor. The structure includes a link 34 of channel construction having a base wall 35, which wall carries a pair of longitudinally spaced laterally extending fasteners 36. It will be noted that one of the fasteners is preferably in the form of a bolt so as to facilitate connection of the cable to the pulley. A flexible cable 37 has its ends anchored to the fasteners and includes a loop or bight 38 seated in a peripheral groove of a pulley 39. The pulley is secured to the rear end of a driven shaft 40 which supports a wiper arm at its fore end. The loop of the cable is provided with a fitting 41 secured thereto which is caught in a recess in the pulley in the same manner as fitting 28 in FIGURE 3. It will be noted that the points of connection between the ends of the cable and the fasteners are spaced from the link sufficient distances to provide clearance for the pulley.

Having thus described my invention, it is obvious that various modifications may be made in the same without departing from the spirit of the invention, and, therefore, I do not wish to be understood as limiting myself to the exact forms, constructions, arrangements, and combinations of parts herein shown and described.

I claim:

[1. In a windshield wiper assembly and in combination: a power unit, a wiper arm and blade subassembly, a driven shaft connected with and actuating the said subassembly, a pulley-like member connected with and adapted to actuate the shaft, a reciprocally driven substantially rigid link connected with the power unit, flexible driving means disposed about and connected with the pulley-like member and with the link in a manner whereby reciprocating movement imparted to the link by the power unit causes the flexible means to actuate the pulley-like member and oscillate the shaft and the wiper arm and blade subassembly.]

[2. In a windshield wiper assembly and in combination: a wiper arm and blade subassembly, an oscillating driven shaft for actuating said subassembly, a pulley-like member connected with said shaft for movement therewith, reciprocating substantially rigid actuating means adapted for connection with a power unit and with said pulley-like member, crank means connected with said power unit and with said actuating means to drive said actuating means, flexible means disposed about and connected with the pulley-like member and with the actuating means in a manner whereby movement of the actuating means causes the flexible means to actuate the pulley-like member and said subassembly, said crank means and actuating means being arranged to produce between them a toggle action at each end of the stroke of said actuating means.]

[3. In a windshield wiper assembly and in combination: a wiper arm and blade subassembly, a power unit, a driven shaft connected with said subassembly, a pulley connected with said driven shaft, actuating means, flexible means substantially surrounding the pulley and having aligned portions with ends attached to the actuating means for supporting one extremity of the actuating means in a manner whereby reciprocatory movement is imparted to the actuating means and causes the flexible means to oscillate the shaft and pulley, means associated with said power unit to drive said actuating means thereby to drive the pulley, said aligned portions of said flexible means being disposed substantially tangent to the pulley.]

[4. In a windshield wiper assembly and in combination, a wiper arm and blade subassembly, a driven shaft connected with said subassembly, a pulley member connected with said shaft, flexible cable means engaging in wrapped relationship an outer surface of said pulley member, means for limiting slippage of said cable on said pulley member, a unitary member, said cable means having its ends each secured to and coactive with said unitary member at spaced-apart portions of said unitary member, said portions of said unitary member each lying adjacent said pulley member and being adapted respectively to drive said pulley member oscillatably, said unitary member being adapted for connection with a power source for reciprocal operation thereby.]

[5. In a windshield wiper assembly and in combination, a windshield wiper blade and a source of power, means interposed between and connecting said power source and said windshield wiper blade for transmitting motion reciprocally from said power source to said blade, said means comprising a pulley-like member, pivot means operatively connecting said pulley-like member with said blade, flexible cable means engaging in wrapped relationship an outer surface of said pulley-like member, means for limiting slippage of said cable means on said pulley-like member, a substantially rigid member operatively connected with said power source, said cable means being operatively secured to and coactive with said rigid member and being adapted to drive said pulley as said rigid member is moved with relation to said pulley by power from said source.]

[6. In a windshield wiper assembly and in combination, a pulley-like member being connected to oscillate with and being adapted to activate a windshield wiper blade, a power source having connection with and adapted to activate said pulley-like member, said last-mentioned connection comprising a substantially rigid reciprocating member having attached thereto for coaction therewith cable means operatively embracing said pulley-like member and adapted to oscillate same.]

[7. In a windshield wiper assembly and in combination, a source of power for reciprocal activation of said assembly, a windshield wiper blade and arm subassembly disposed exteriorly of a windshield, means operatively connecting said blade and arm subassembly with said power source, said means comprising a pivot shaft with the outer extremity of which shaft the wiper arm is connected to be driven thereby, a pulley-like member operatively associated with the inner end of said pivot shaft and adapted to drive said shaft, a flexible member adapted to engage and conform to a substantial peripheral portion of said pulley-like member to drive said pulley-like member, a substantially rigid elongate linkage member, said flexible member being operatively connected with said linkage member adjacent an end portion thereof, a portion of said linkage member remote from said end portion being operatively connected with said source of power for reciprocal transmission of power from said source of power to said wiper blade for oscillatory movement of said blade.]

[8. In a windshield wiper assembly and in combination, a source of power for reciprocal activation of said assembly, a windshield wiper blade and arm subassembly disposed exteriorly of a windshield, means operatively connecting said blade and arm subassembly with said power source, said means comprising a pivot shaft with the outer extremity of which shaft the wiper arm is connected to be driven thereby, a pulley-like member operatively associated with the inner end of each of said pivot shaft and adapted to drive said shaft, flexible cable means wrapped in engaging relationship with a substantial peripheral portion of said pulley-like member to drive said pulley-like member, a substantially inflexible elongate linkage member, said flexible cable means having ends operatively connected with said linkage member at locations relatively close to the pulley-like member, a portion of said linkage member remote from said pulley-like member being operatively connected with said source of power for reciprocal transmission of power from said source of power to said wiper blade for oscillatory movement of said blade.]

[9. In a windshield wiper assembly and in combination: a driven shaft having a pulley secured thereto, actuating means, said actuating means being provided with a pair of fasteners, guide means carried by said actuating means for receiving a portion of the pulley, flexible means substantially surrounding the pulley and having ends attached respectively to the fasteners in a manner whereby reciprocation of the actuating means will cause the flexible means to oscillate the shaft and pulley, said guide means coacting with said pulley to provide interengaging relationship therebetween for stabilizing the relative movement between said guide means and said pulley.]

[10. In a windshield wiper assembly and in combination: a driven shaft for actuating a wiper arm, a pulley-like member connected with said shaft for actuating the shaft, a power unit, reciprocating means carrying cable means and adapted to operatively connect said power unit with said pulley-like member, guide means carried by said reciprocating means for receiving in embracing relationship a portion of said pulley-like member, said cable means surrounding said pulley-like member and having ends attached to said reciprocating means at locations relatively close to said pulley-like member, in a manner whereby reciprocation of said reciprocating means causes the cable means to oscillate said pulley-like member and said shaft, means for limiting slippage of said cable means relative to said pulley-like member, said guide means coacting with said pulley-like member to provide interengagement therebetween for stabilizing the relative movement between said guide means and said pulley-like member.]

[11. In a windshield wiper assembly and in combination, a pulley-like member being connected to oscillate with and being adapted to activate a windshield wiper blade, a power source having connection with and adapted to activate said pulley-like member, said last-mentioned connection comprising a substantially rigid reciprocating member having attached thereto for coaction therewith cable means operatively embracing said pulley-like member and adapted to oscillate same, and guide means for maintaining said reciprocating member substantially in operative relationship with said pulley-like member.]

12. In a windshield wiper combination: a driven oscillating shaft for actuating a member, a pulley-like support for actuating the shaft, a reciprocating link for connection with a power unit, said link being provided with slots, a fastener movable in the slots, [elongated] *elongate* flexible means disposed about and connected to the support and having one end attached to the fastener and its other end to the link at a location spaced from the fastener in a manner whereby movement of the link will cause the flexible means to actuate the support and shaft, said slots being disposed at an angle to a line connecting the attached ends of the flexible means, and means for urging the fastener in one direction in the slots for tensioning the flexible means.

13. In a windshield wiper combination: a driven oscillating shaft for actuating a member, a pulley-like support for actuating the shaft, a reciprocating link adapted for attachment with a power unit, a cable wrapped about the support and connected to the link at longitudinally spaced locations so that movement imparted to the link will actuate the support and shaft, slot means at one of said locations, said slots sloping away from the other location, movable fastener means slidable in said slots for connecting the cable to the link at said one location, and means for tensioning the cable by urging the movable fastener to slide in said slots.

14. In a windshield wiper combination: a driven shaft having a pulley secured thereto, actuating means provided with a pair of fasteners and guide means for overlapping a portion of the pulley, [elongated] *elongate* flexible means substantially surrounding the pulley and having ends attached to the fasteners in a manner whereby reciprocation of the actuating means will cause the flexible means to oscillate the shaft and pulley, one of said fasteners being movable in the guide means, and means acting on the movable fastener for maintaining the flexible means in a taut condition whereby to hold said guide means in overlapping relation to the pulley.

[15. In a windshield wiper assembly and in combination: a source of power, a wiper arm and blade subassembly, a driven shaft operatively connected with said subassembly, a pulley-like member connected with and adapted to actuate the shaft, a substantially rigid link operatively driven by said source of power, flexible driving means disposed about and connected with the pulley-like member and with spaced-apart portions of the link whereby reciprocating movement imparted to the link by the source of power causes the flexible means to actuate the pulley-like member and oscillate the shaft and the wiper arm and blade subassembly.]

[16. In a windshield wiper assembly and in combination: a wiper arm and blade subassembly, an oscillating driven shaft for actuating said subassembly, a pulley-like member connected with said shaft for movement therewith, reciprocating substantially rigid actuating means adapted for connection with a power unit and with said pulley-like member, crank means connected with said power unit and with said actuating means to drive said actuating means, and flexible means disposed about and connected with the pulley-like member and with spaced-apart portions of the actuating means in a manner whereby movement of the actuating means causes the flexible means to actuate the pulley-like member and said subassembly.]

*17. In a windshield wiper combination: a driven oscillating shaft for actuating a member, a pulley-like sup-*

*port for actuating the shaft, a reciprocating link for connection with a power unit, said link being provided with guide means for overlapping a portion of the pulley-like support, elongate flexible means operatively associated with said pulley-like member and the reciprocating link in a manner whereby reciprocation of the reciprocating link will cause the flexible means to oscillate the pulley-like support and the driven shaft, fastening means connected to one end of the elongate flexible means and movably associated with the guide means, and means acting on said fastener for maintaining the flexible means in a taut condition to hold said link and guide means in operative relation to the pulley-like support.*

References Cited in the file of this patent or the original patent

UNITED STATES PATENTS

| | | |
|---|---|---|
| 387,386 | Whitney | Aug. 7, 1888 |
| 712,147 | Myers | Oct. 28, 1902 |
| 987,909 | Peirce | Mar. 28, 1911 |
| 2,232,480 | Schmid | Feb. 18, 1941 |
| 2,410,611 | Pratt | Nov. 5, 1946 |
| 2,491,341 | Tillman | Dec. 13, 1949 |
| 2,690,082 | Orcutt | Sept. 28, 1954 |
| 2,691,186 | Oishei et al. | Oct. 12, 1954 |
| 2,810,294 | Latta et al. | Oct. 22, 1957 |

FOREIGN PATENTS

| | | |
|---|---|---|
| 324,782 | Great Britain | Feb. 6, 1930 |
| 466,884 | Canada | July 25, 1950 |
| 608,029 | France | July 13, 1926 |
| 636,152 | France | Apr. 3, 1928 |
| 647,006 | France | July 23, 1928 |
| 678,333 | France | Dec. 23, 1929 |